US008772651B2

(12) United States Patent
Martin et al.

(10) Patent No.: US 8,772,651 B2
(45) Date of Patent: Jul. 8, 2014

(54) TURNTABLE INTEGRATED SCALE

(75) Inventors: Curtis W. Martin, Georgetown, IN (US); Gary L. Peters, Louisville, KY (US)

(73) Assignee: Lantech.com, LLC, Louisville, KY (US)

( * ) Notice: Subject to any disclaimer, the term of this patent is extended or adjusted under 35 U.S.C. 154(b) by 185 days.

(21) Appl. No.: 13/283,900

(22) Filed: Oct. 28, 2011

(65) Prior Publication Data

US 2012/0175170 A1 Jul. 12, 2012

Related U.S. Application Data

(60) Provisional application No. 61/430,724, filed on Jan. 7, 2011.

(51) Int. Cl.
*B65B 11/28* (2006.01)
*G01G 19/52* (2006.01)

(52) U.S. Cl.
USPC ............................................... 177/83; 177/84

(58) Field of Classification Search
CPC ............................... B65B 11/045; G01G 13/22
USPC ............................... 177/1–3, 83–88, 145, 211
See application file for complete search history.

(56) References Cited

U.S. PATENT DOCUMENTS

| | | | | |
|---|---|---|---|---|
| 3,112,000 A | * | 11/1963 | Carrier, Jr. et al. | 177/54 |
| 4,590,737 A | * | 5/1986 | Rosenthal et al. | 53/211 |
| 4,598,534 A | * | 7/1986 | Rosenthal et al. | 53/588 |
| 5,135,113 A | * | 8/1992 | Mayer et al. | 209/539 |
| 5,565,655 A | * | 10/1996 | Jeon | 177/245 |
| 5,758,471 A | * | 6/1998 | Denley et al. | 53/399 |
| 5,893,258 A | * | 4/1999 | Lancaster, III | 53/399 |
| 5,911,666 A | * | 6/1999 | Lancaster et al. | 53/492 |
| 5,941,049 A | * | 8/1999 | Lancaster et al. | 53/399 |
| 6,848,237 B2 | * | 2/2005 | Lancaster et al. | 53/399 |
| 6,880,316 B2 | * | 4/2005 | Lancaster et al. | 53/588 |
| 7,089,713 B2 | * | 8/2006 | Lancaster et al. | 53/399 |
| 7,137,233 B2 | * | 11/2006 | DeGrasse et al. | 53/399 |
| 7,402,762 B2 | * | 7/2008 | Draper et al. | 177/83 |
| 7,812,267 B2 | * | 10/2010 | Draper et al. | 177/83 |
| 8,474,224 B2 | * | 7/2013 | Rossi | 53/211 |
| 2007/0204565 A1 | * | 9/2007 | Lancaster et al. | 53/399 |

(Continued)

FOREIGN PATENT DOCUMENTS

EP 0 205 909 A1 12/1986

OTHER PUBLICATIONS

European Patent Office; Search Report and Written Opinion in International Patent Application No. PCT/US2011/058251 dated May 3, 2012; 8 pages.

*Primary Examiner* — Randy W Gibson
*Assistant Examiner* — Natalie Huls
(74) *Attorney, Agent, or Firm* — Wood, Herron & Evans, LLP

(57) ABSTRACT

A turntable that can be used with a machine for wrapping loads with packaging material includes a turntable assembly having a first support assembly and a load support surface supported for rotation on the first support assembly. A second support assembly contacts a floor surface, and a plurality of load cells disposed between the first and second support assemblies space the first support assembly and the load support surface above the floor surface. In use, the load cells sense a weight of a load on the load support surface.

11 Claims, 7 Drawing Sheets

(56) References Cited

U.S. PATENT DOCUMENTS

| | | | |
|---|---|---|---|
| 2008/0078588 A1* | 4/2008 | Draper et al. | 177/145 |
| 2010/0064906 A1* | 3/2010 | Rossi | 100/15 |
| 2010/0313525 A1* | 12/2010 | Martin et al. | 53/461 |
| 2011/0146203 A1* | 6/2011 | Lancaster et al. | 53/220 |
| 2012/0061150 A1* | 3/2012 | Coulombe et al. | 177/54 |
| 2013/0300047 A1* | 11/2013 | Hendren et al. | 269/57 |

* cited by examiner

TURNTABLE INTEGRATED SCALE

CROSS-REFERENCE TO RELATED APPLICATIONS

This application claims the filing benefit of U.S. Provisional Patent Application Ser. No. 61/430,724 filed on Jan. 7, 2011, which is incorporated by reference herein in its entirety.

TECHNICAL FIELD

The present disclosure relates to methods and apparatus for wrapping loads with packaging material, and more particularly to apparatus for determining the weight of load wrapped by a wrapping machine.

BACKGROUND

Various packaging techniques have been used to assemble a load of unit products and subsequently wrap them for transportation, storage, containment and stabilization, protection and waterproofing. Products are often stacked as a load on a pallet to simplify handling of the products. The pallet load is commonly wrapped with stretch wrap packaging material. One system uses stretch wrapping machines to stretch, dispense, and wrap stretch packaging material around a load. Stretch wrapping can be performed as an inline, automated packaging technique that dispenses and wraps packaging material in a stretched condition around a load on a pallet to cover and contain the load. Pallet stretch wrapping, whether accomplished by a turntable, a rotating arm, or a vertical rotating ring, typically covers the four vertical sides of the load with a stretchable film, such as polyethylene film. In each of these arrangements, relative rotation is provided between the load and the packaging material dispenser to wrap packaging material around the sides of the load.

It is often desirable to determine the weight of a loaded pallet that is to be wrapped with packaging material. For example, it may be desired to determine the weight of each loaded pallet that will be placed into a truck for shipment. Conventional methods for determining the weight of a loaded pallet involve moving the loaded pallet to a scale, generally with a forklift or other equipment, and then weighing the loaded pallet. After the loaded pallet has been weighed, the load can then be moved to an appropriate stretch wrapping machine for wrapping with packaging material. Alternatively, the loaded pallet can be weighed after wrapping, by moving the wrapped load from the wrapping machine to a scale and weighing the wrapped, loaded pallet. Accordingly, weighing of the load, either before or after wrapping, requires additional processing steps that necessarily increase the time, manpower, and equipment resources needed to prepare a loaded pallet for shipping.

A need therefore exists for apparatus and methods that overcome drawbacks of conventional methods and apparatus for determining the weight of a loaded pallet prior to shipment, such as those described above.

SUMMARY

The present invention overcomes the foregoing and other shortcomings and drawbacks of convention apparatus and methods used to determine the weight of a loaded pallet prior to shipment. While the invention will be described in connection with certain embodiments, it will be understood that the invention is not limited to these embodiments. On the contrary, the invention includes all alternatives, modifications, and equivalents as may be included within the spirit and scope of the present invention.

According to one aspect of the present invention, a turntable assembly for use with a wrapping machine includes a load support surface, a drive assembly for rotating the load support surface, and a first support assembly supporting the drive assembly and the load support surface. A plurality of load cell assemblies support the first support assembly and determine a value indicative of a weight of a load on the load support surface.

In another aspect of the present invention, an apparatus for wrapping a load with packing material includes a turntable assembly having a first support assembly and a load support surface supported for rotation on the first support assembly. A second support assembly contacts a floor surface, and a plurality of load cell assemblies disposed between the first and second support assemblies space the first support assembly and the load support surface above the floor surface. In use, the load cell assemblies sense a weight of a load on the load support surface. Rolling elements may be disposed between the load support surface and the first support assembly to facilitate rotational movement of the load support surface relative to the first support assembly. The first support assembly may be constrained relative to the second support assembly for movement in a direction substantially parallel to a rotational axis of the load support surface.

In another aspect of the invention, the apparatus for wrapping a load may further include a packing material dispenser for dispensing packing material to a load supported on the load support surface during rotation of the load support surface. The apparatus for wrapping a load may further include a display indicating the weight of the load on the load support surface based on the weight sensed by the load cell assemblies.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to explain the principles of the invention.

DETAILED DESCRIPTION

Reference will now be made to the present embodiments of the disclosure, examples of which are illustrated in the accompanying figures. Wherever possible, the same reference numbers will be used throughout the figures to refer to the same or like parts.

Figure 1:
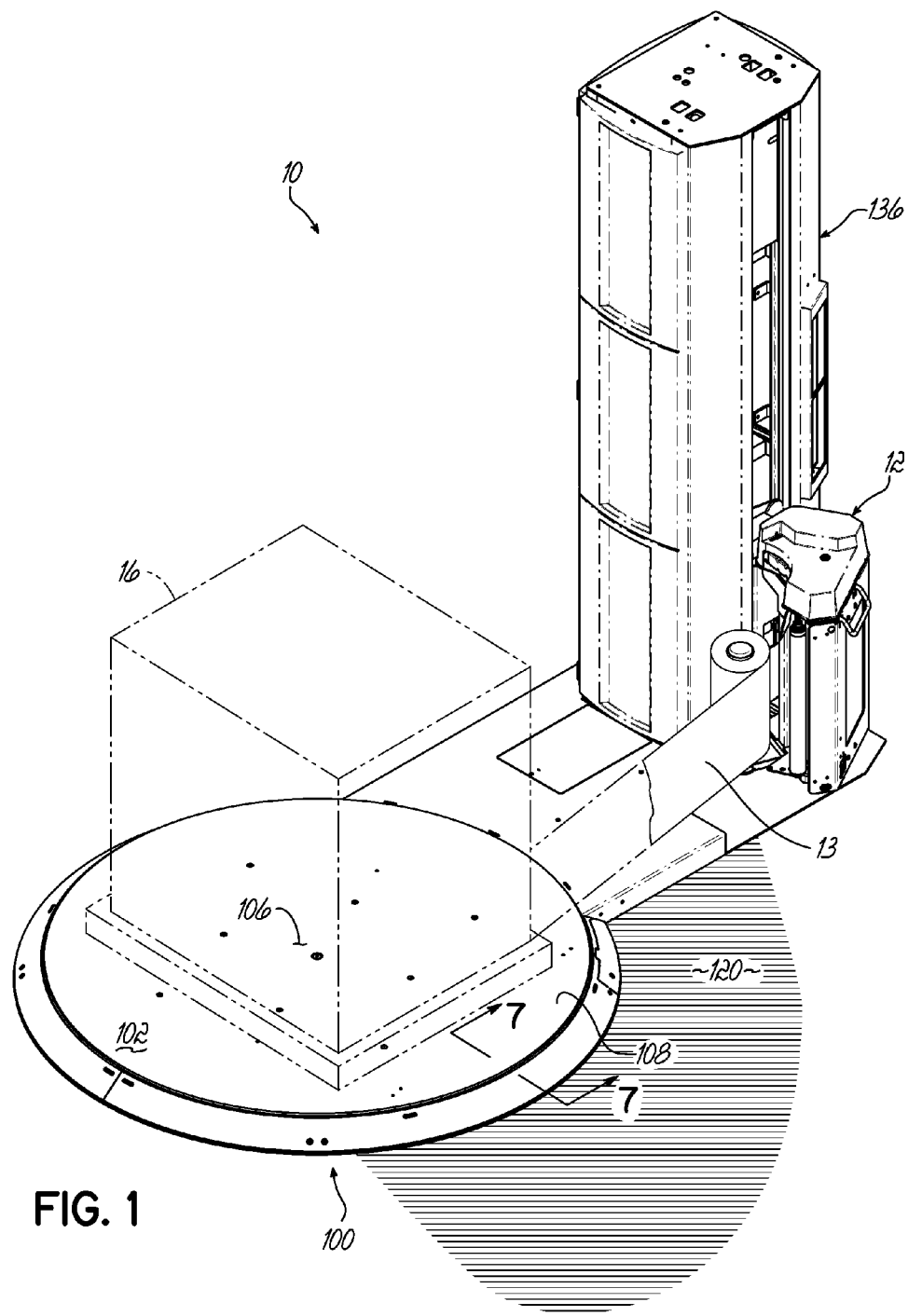
FIG. 1 is a perspective view of an exemplary apparatus for wrapping a load, including an exemplary turntable in accordance with the principles of the present disclosure.

As shown in FIG. 1, a wrapping apparatus 10 includes a packaging material dispenser 12 configured to dispense packaging material 13 onto a load 16. Packaging material dispenser 12 may be configured to travel substantially vertically up and down a support column 14 (partially shown in FIG. 4) while dispensing the packaging material 13. The vertical movement of packaging material dispenser 12 and the relative rotation between load 16 and packaging material dispenser 12 provides for wrapping of load 16 with the packaging material 13 in a spiral fashion, as would be apparent to one skilled in the art.

Figure 2:
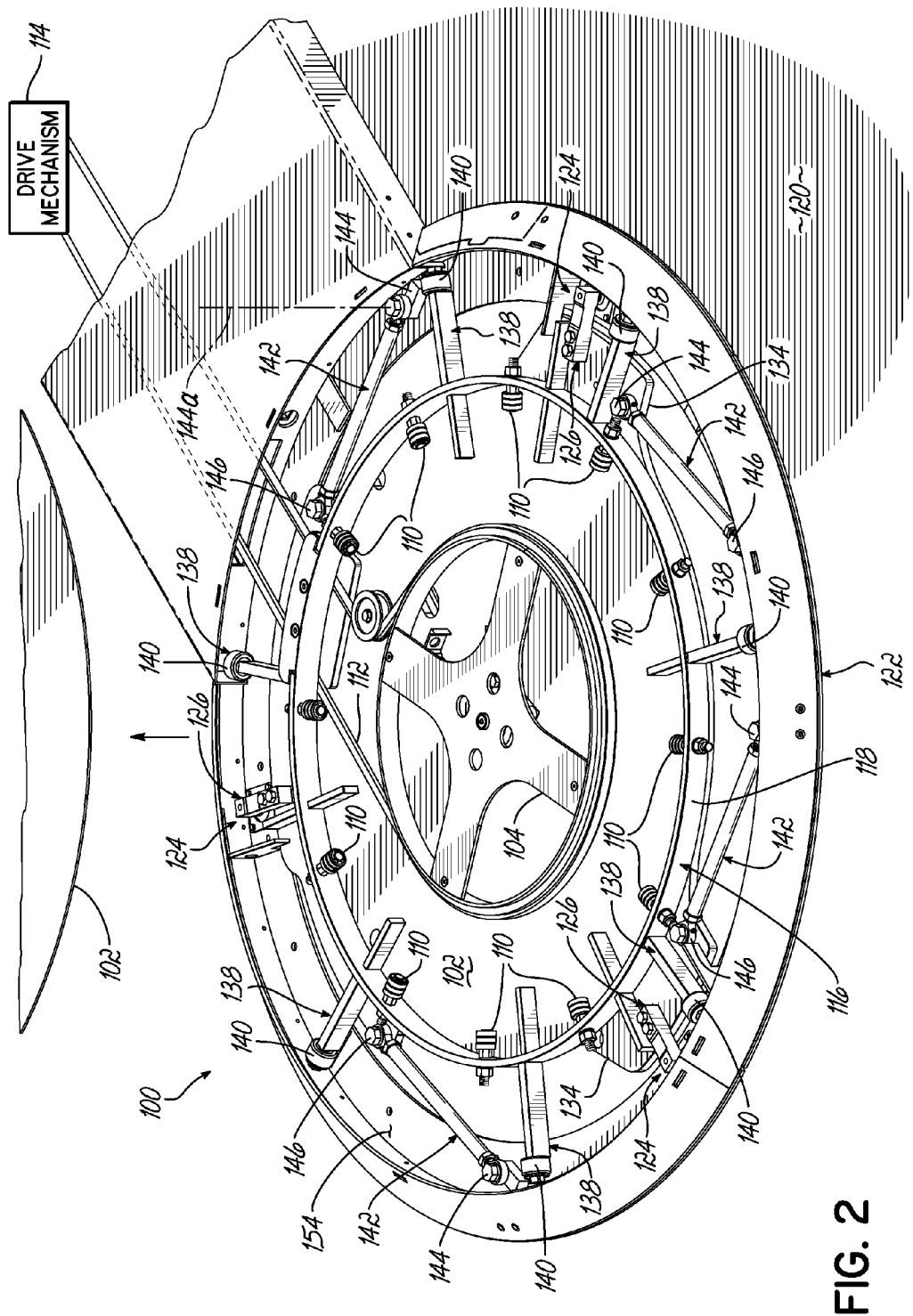
FIG. 2. is a perspective view of the turntable of FIG. 1, with a load supporting surface removed.
Figure 3:
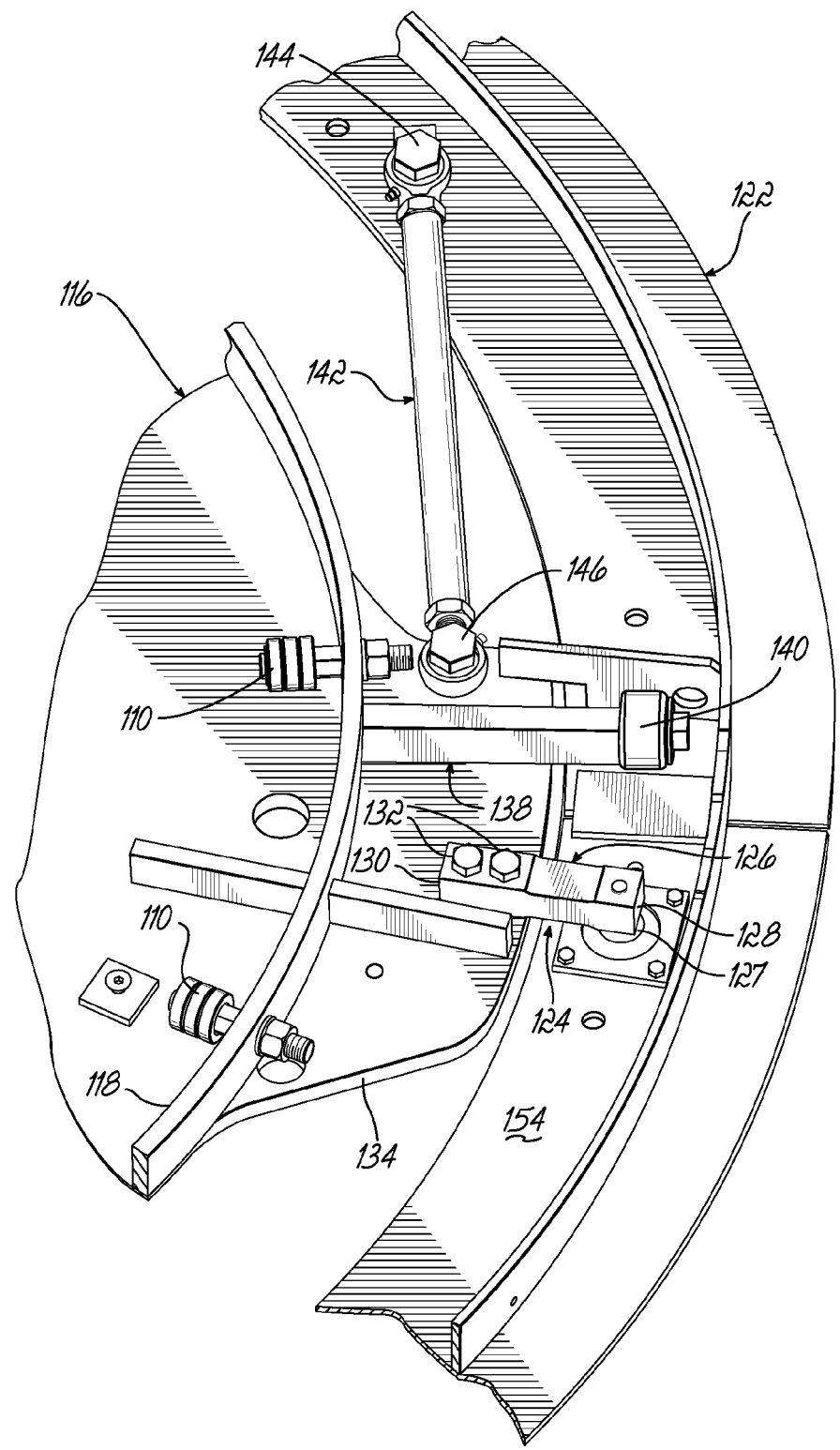
FIG. 3 is an enlarged detail view of a portion of the turntable of FIG. 2.

Relative rotation between packaging material dispenser 12 and load 16 may be provided by a turntable assembly 100, shown in FIGS. 1-3. Turntable assembly 100 may include a load support surface 102 upon which load 16 rests. In FIGS. 2 and 3, load support surface 102 has been removed to expose turntable assembly components underneath. As shown in FIG. 2, turntable assembly 100 includes a pulley 104. A central portion 106 of load support surface 102 may be coupled to pulley 104 such that load support surface 102 may rotate as pulley 104 rotates. An outer portion 108 of load support surface 102 engages first rolling elements such as bearing assemblies 110. Bearing assemblies 110 are configured to rotatably support outer portion 108 of load support surface 102.

A belt 112 operatively couples pulley 104 and a drive mechanism 114. Belt 112 is in tension, and engages portions of pulley 104 and drive mechanism 114. The drive mechanism 114 may include, for example, a motor (not shown) configured to engage and drive belt 112. Belt 112, pulley 104, and the drive mechanism 114 may form a drive assembly. When belt 112 is driven, belt 112 causes rotation of pulley 104, load support surface 102, and load 16.

Pulley 104 is rotatably supported by an inner support assembly 116 of turntable assembly 100. Bearing assemblies 110 are positioned around a lip portion 118 of inner support assembly 116. Inner support assembly 116 is supported a selected distance above a floor surface 120 by an outer support assembly 122. Inner support assembly 116 is coupled to outer support assembly 122 by load cell assemblies 124. It is contemplated that inner support assembly 116 may be coupled to outer support assembly 122 by up to three load cell assemblies 124, as shown in FIG. 2, or more than three load cell assemblies 124 if desired.

Figure 7:
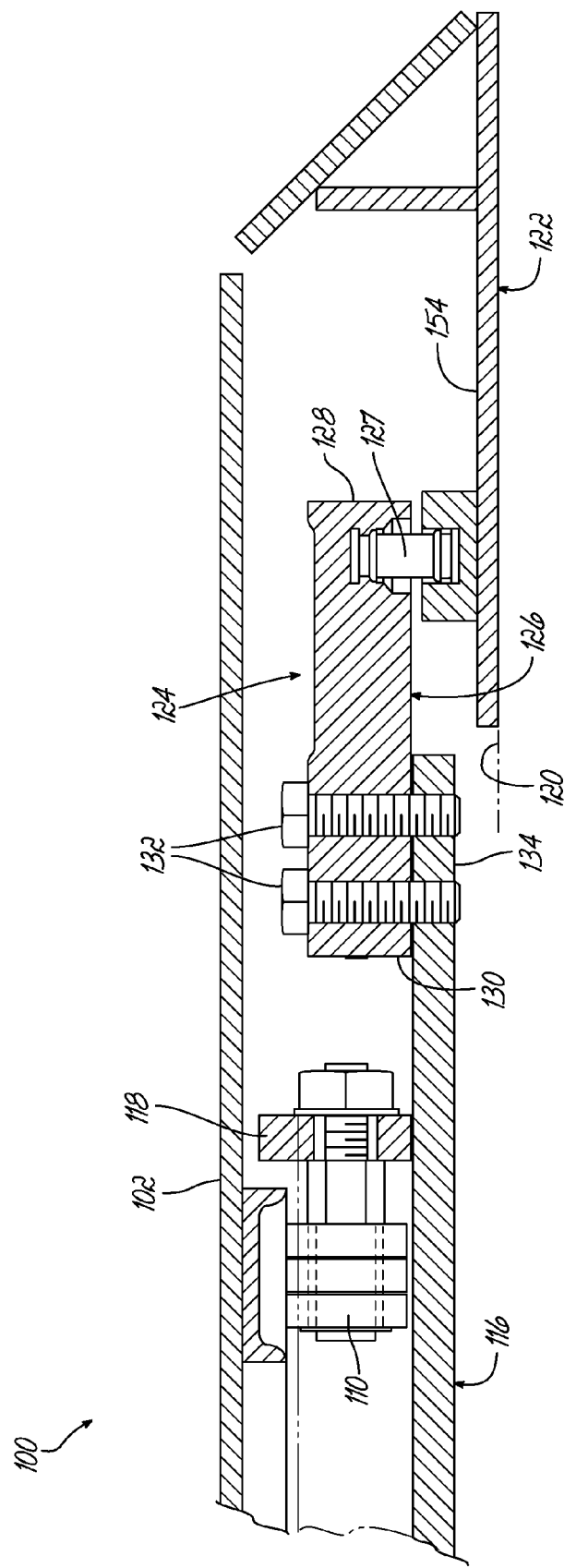
FIG. 7 is a partial cross-sectional view of the turntable of FIG. 1.

As shown in FIGS. 3 and 7, load cell assembly 124 includes a rectangular element 126. A first end 128 of rectangular element 126 rests on a pin 127 that, in turn, rests on outer support assembly 122, as shown in FIG. 7. A force of the weight of load 16, when applied to load support surface 102, is transmitted to pins 127. A second end 130 of rectangular element 126 is coupled to inner support assembly 116 by, for example, one or more bolts 132. Bolts 132 may attach second end 130 to a cantilevered support 134 extending from lip portion 118 of inner support assembly 116, as shown in FIG. 3. Thus, rectangular element 126 is substantially rigid with inner support assembly 116. It will be appreciated that other types of load cell assemblies and configurations may alternatively be used as long as they are suitable for meeting space requirements and have sufficient capacity for the types of forces experienced.

Figure 4:
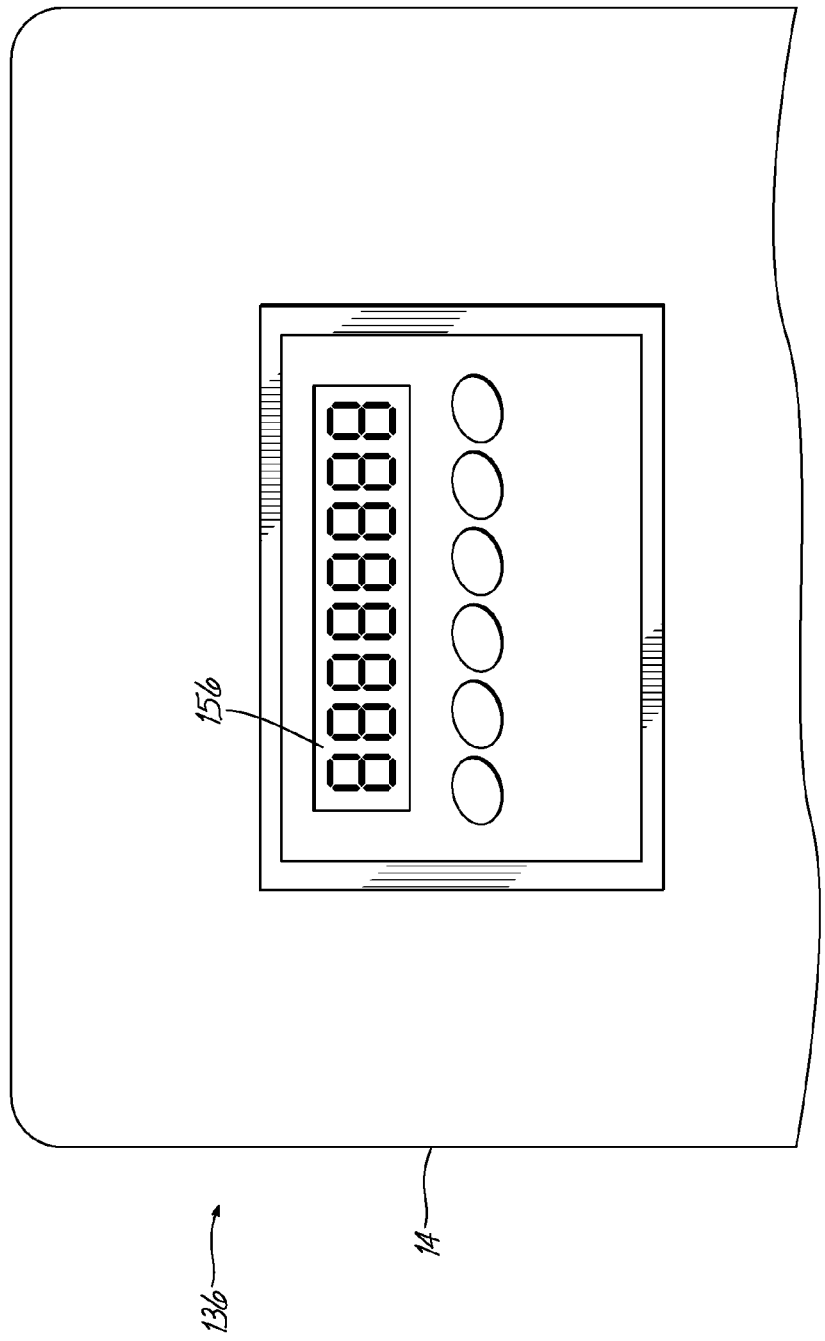
FIG. 4 is a partial elevation view of an exemplary display used with the apparatus of FIG. 1.

Each load cell assembly 124 is configured to take a weight measurement when load 16 rests on load support surface 102, and load support surface 102 is not rotating. This helps to ensure that forces associated with rotating load support surface 102 do not reduce the accuracy of the weight measurements. The weight measurements may be combined to determine a weight of load 16. For example, while load 16 is resting on load support surface 102, the weight of load 16, load support surface 102, pulley 104, bearing assemblies 110, inner support assembly 116, belt 112, and tie bar assemblies 142 may exert a force on rectangular elements 126 of load cell assemblies 124, causing stress on rectangular elements 126. Each of load cell assemblies 124 may transform their respective stress levels into a signal. The signals may be sent to a controller 136, as shown in FIG. 4. Controller 136 may convert the signals into weight measurements, and may add the weight measurements together, while subtracting out known weight values for load support surface 102, pulley 104, bearing assemblies 110, inner support assembly 116, belt 112, and tie bar assemblies 142, for example, to determine the weight of load 16. The weight of load 16 may be displayed on a display 156.

As shown in FIGS. 2 and 3, inner support assembly 116 also includes cantilevered arm assemblies 138 extending in a cantilevered fashion from lip portion 118 over outer support assembly 122 to limit tilting of inner support assembly 116. Arm assemblies 138 may be spaced apart from a top surface 154 of outer support assembly 122 by a selected distance. Second rolling elements such as wheel assemblies 140 rotatably mounted on arm assemblies 138 may rotatably support outer portion 108 of load support surface 102. For example, when load 16 is deposited on load support surface 102 by a vehicle (not shown) (e.g., a forklift, pallet truck, or the like), the vehicle may impart intense and/or irregular forces on load support surface 102. Wheel assemblies 140 help to ensure that those forces do not cause load support surface 102 to deflect into contact with outer support assembly 122 such as by engaging at least a portion of the load support surface 102 when a load thereon exceeds a predetermined amount.

Tie bar assemblies 142 may be coupled to inner support assembly 116 and outer support assembly 122. A first portion 144 of tie bar assembly 142 may be rotatably coupled to outer support assembly 122, with the axis of rotation 144a of first portion 144 extending substantially perpendicularly from top surface 154 of outer support assembly 122. A second portion 146 of tie bar assembly 142 may be rotatably coupled to inner support assembly 116, with the axis of rotation of second portion 146 extending substantially perpendicularly from cantilevered support 134 extending from lip portion 118. With this arrangement, tie bar assemblies 142 may prevent relative rotation between inner support assembly 116 and outer support assembly 122 when pulley 104 is driven by belt 112, and may prevent tension forces exerted on pulley 104 by belt 112 from shifting inner support assembly 116 relative to outer support assembly 122. As such, tie bar assemblies 142 may isolate load cell assemblies 138 from stresses produced by driving belt 112 and/or tension of belt 112. It will be appreciated, however, that tie bar assemblies 142 may alternatively be coupled to inner support assembly 116 in various other ways to prevent relative rotation between inner support assembly 116 and outer support assembly 122.

Figure 5:
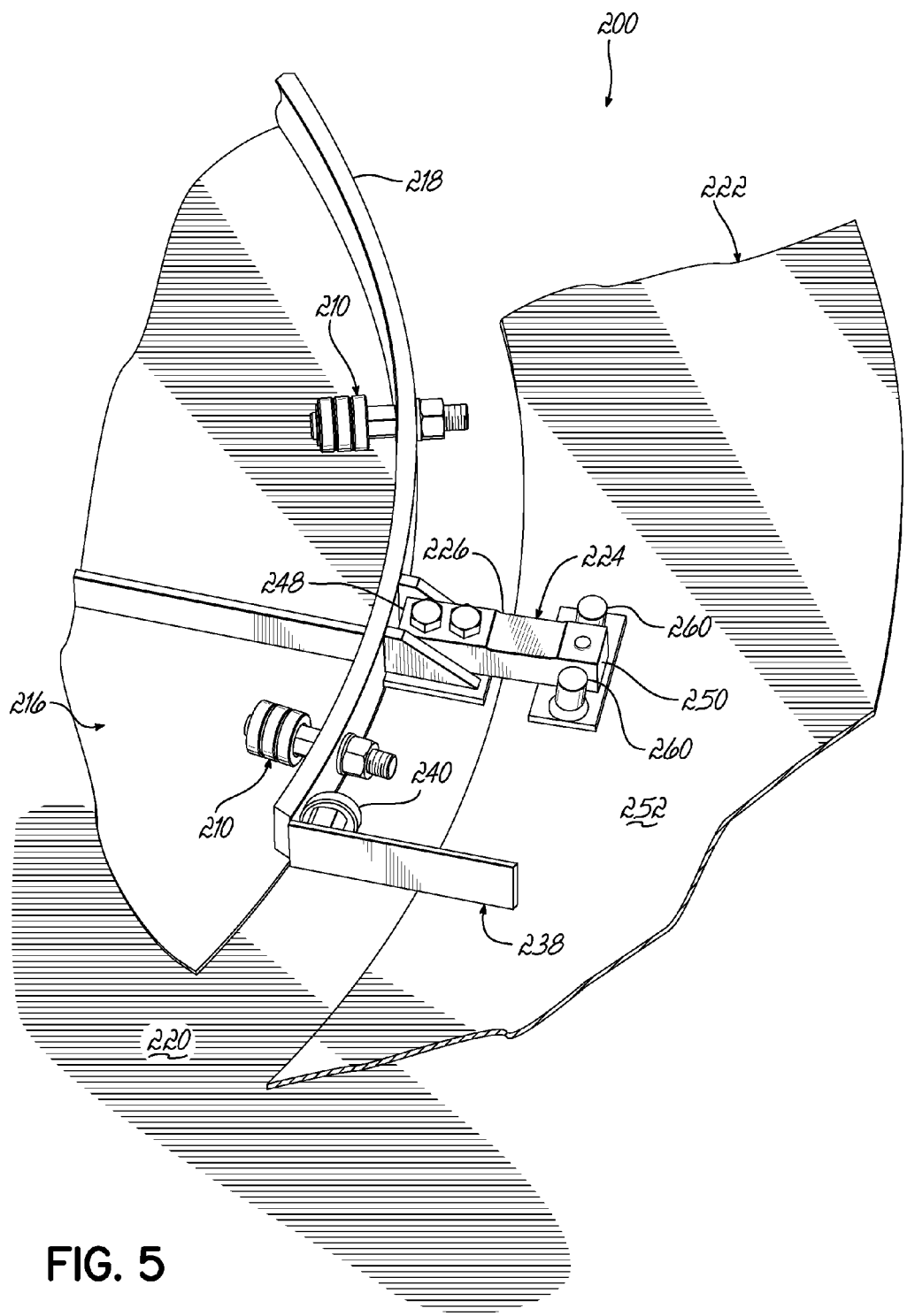
FIG. 5 is a partial perspective view of a portion of another embodiment of a turntable in accordance with e principles of the present disclosure.
Figure 6:
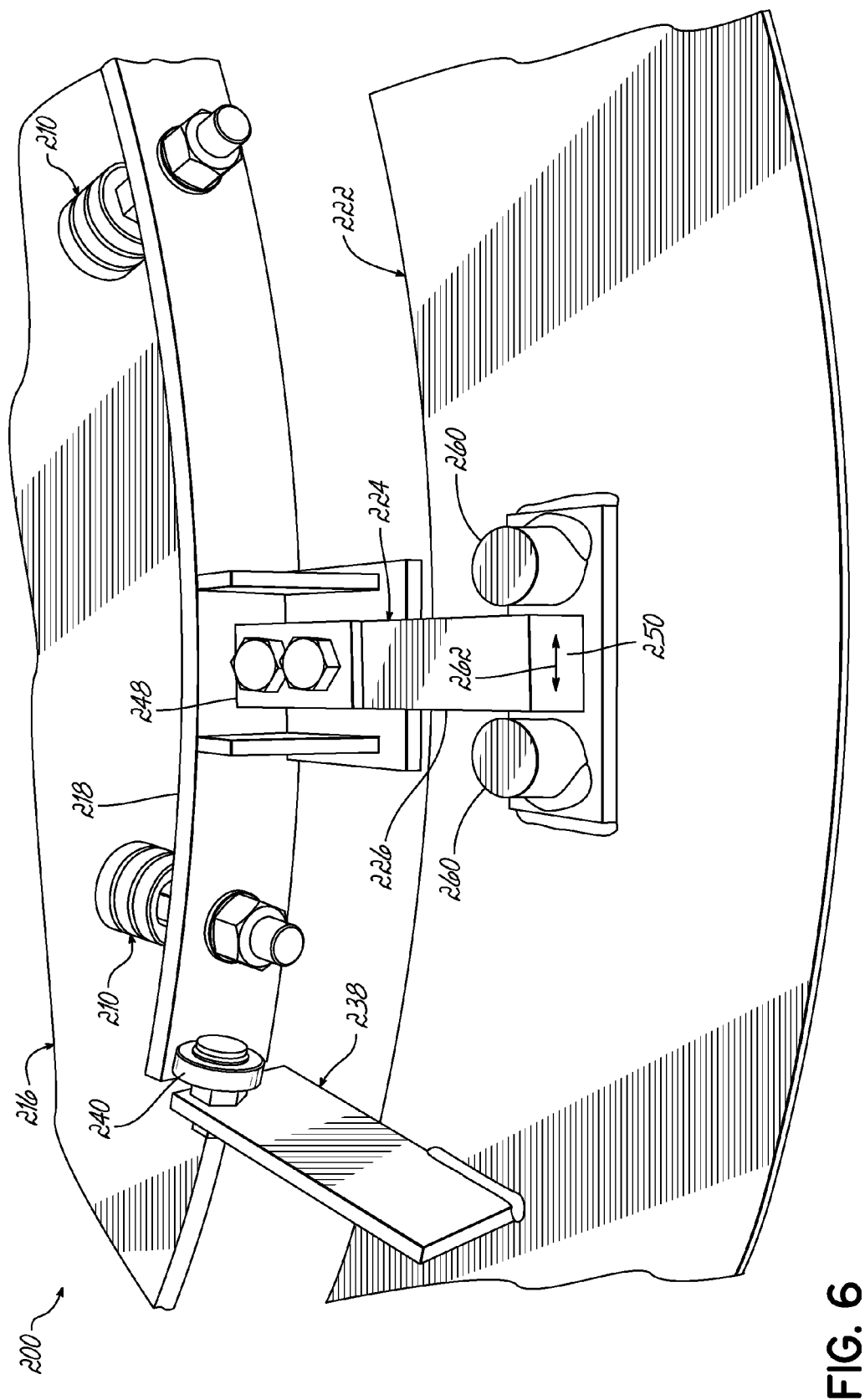
FIG. 6 is a partial perspective view of the turntable of FIG. 5, from another angle.

FIGS. 5 and 6 depict another exemplary embodiment of a turntable assembly 200 similar to turntable assembly 100 shown and described above, wherein similar components have been similarly numbered. For example, turntable assembly 200 may include an inner support assembly 216 spaced above a floor surface, an outer support assembly 222, bearing assemblies 210, and a controller (not shown) similar to controller 136. The steps for determining a weight of a load on turntable assembly 200 may be similar to the steps described above for turntable assembly 100.

One difference between turntable assembly 200 and turntable assembly 100 is that load cell assemblies 224 of turntable assembly 200 may each include a rectangular element 226 having a fixed end 248 bolted to a cantilevered portion 234 of inner support assembly 216, and a free end 250 configured to engage a support portion 252 on outer support assembly 222. The engagement between free end 250 and outer support assembly 222 may be through a pin (not shown), similar to the arrangement shown in FIG. 7. Support portion 252 may include supports, or stops, 260 configured to limit transverse movement of rectangular element 226 that may be caused by relative rotation between inner support assembly 216 and outer support assembly 222.

Another difference between turntable assembly 200 and turntable assembly 100 is that arm assemblies 238 of turntable assembly 200 are coupled to outer support assembly 222, and extend toward inner support assembly 216, engaging a lip portion 218 of inner support assembly 216 with wheel assemblies 240. Arm assemblies 238 may serve to reduce or prevent relative radial movement between inner support assembly 216 and outer support assembly 222 (depicted by arrow 262 in FIG. 6), caused, for example, by forces associated with at least one of a vehicle traversing turntable assembly 200 when depositing or picking up a load, or by movement of and/or tension in belt 212. Supports 260 and arm assemblies 238 of turntable assembly 200 may perform functions similar to tie bar assemblies 142 in turntable assembly 100.

While the present invention has been illustrated by the description of one or more embodiments thereof, and while the embodiments have been described in considerable detail, they are not intended to restrict or in any way limit the scope of the appended claims to such detail. The various features shown and discussed herein may be used alone or in combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A turntable assembly, comprising:
   a load support surface;
   a drive assembly configured to rotate the load support surface;
   a first support assembly supporting the drive assembly and the load support surface;
   a plurality of load cell assemblies supporting the first support assembly, the plurality of load cell assemblies determining a value indicative of a weight of a load on the load support surface when the load is placed on the load support surface;
   a second support assembly supporting the plurality of load cell assemblies; and
   at least one tie bar assembly extending between the first support assembly and the second support assembly, the tie bar assembly constraining the first support assembly relative to the second support assembly for movement in a direction substantially parallel to a rotational axis of the load support surface.

2. The turntable assembly of claim 1, wherein the plurality of load cell assemblies experience stress under the weight of the load on the load support surface.

3. The turntable assembly of claim 2, further including a controller, the controller determining the weight of the load on the load support surface based on stress experienced by the plurality of load cell assemblies.

4. The turntable assembly of claim 1, wherein the first support assembly includes at least one cantilevered arm assembly limiting tilting of the first support assembly.

5. The turntable assembly of claim 1, wherein the second support assembly is positioned radially outside the first support assembly and the plurality of load cell assemblies extend radially outward from the first support assembly to the second support assembly.

6. An apparatus for wrapping a load with packaging material, comprising:
   a turntable assembly, comprising:
     a first support assembly,
     a load support surface supported on the first support assembly for rotation with respect thereto,
     a second support assembly positioned radially outside the first support assembly and contacting a floor surface,
     a plurality of load cell assemblies extending radially between the first support assembly and the second support assembly, and
     at least one tie bar assembly extending between the first support assembly and the second support assembly, the tie bar assembly constraining the first support assembly relative to the second support assembly for movement in a direction substantially parallel to a rotational axis of the load support surface;
   whereby the first support assembly and the load support surface are spaced above the floor surface and the plurality of load cell assemblies sense a weight of a load on the load support surface.

7. The apparatus of claim 6, further comprising:
   a plurality of first rolling elements disposed between the load support surface and the first support assembly and facilitating rotational movement of the load support surface relative to the first support assembly.

8. The apparatus of claim 7, further comprising:
   a plurality of second rolling elements disposed between the load support surface and the second support assembly;
   at least one of the second rolling elements engaging at least a portion of the load support surface when a load on the load support surface exceeds a predetermined amount.

9. The apparatus of claim 6, further comprising:
   at least one stop proximate at least one of the load cell assemblies;
   the at least one stop limiting movement of the at least one load cell assembly and thereby constraining the first support assembly relative to the second support assembly for movement in a direction substantially parallel to a rotational axis of the load support surface.

10. The apparatus of claim 6, further comprising:
    a packaging material dispenser for dispensing packaging material to a load supported on the load support surface during rotation thereof relative to the first support assembly.

11. The apparatus of claim 6, further comprising:
    a display indicating a weight of the load on the support surface based on the weight sensed by the load cell assemblies.

* * * * *